United States Patent
Inai et al.

(10) Patent No.: US 7,687,169 B2
(45) Date of Patent: Mar. 30, 2010

(54) STOP METHOD FOR FUEL CELL SYSTEM

(75) Inventors: Shigeru Inai, Shioya-gun (JP); Katsumi Hayashi, Utsunomiya (JP); Ryo Jinba, Utsunomiya (JP); Hideo Kato, Utsunomiya (JP); Tomoki Kobayashi, Utsunomiya (JP); Minoru Uoshima, Utsunomiya (JP); Yasunori Kotani, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 917 days.

(21) Appl. No.: 10/958,495

(22) Filed: Oct. 4, 2004

(65) Prior Publication Data

US 2005/0074641 A1   Apr. 7, 2005

(30) Foreign Application Priority Data

Oct. 6, 2003   (JP) .............................. 2003-347194

(51) Int. Cl.
*H01M 8/04* (2006.01)
(52) U.S. Cl. .......................................... 429/25; 429/17
(58) Field of Classification Search .................. 429/13, 429/17, 25
See application file for complete search history.

(56) References Cited

U.S. PATENT DOCUMENTS 6,103,409 A * 8/2000 DiPierno Bosco et al. .... 429/13
6,514,635 B2 * 2/2003 Van Dine et al. .............. 429/17
6,858,336 B2   2/2005 Reiser et al.
6,916,563 B2 * 7/2005 Yamamoto et al. ............ 429/17
2002/0076583 A1 * 6/2002 Reiser et al. .................. 429/13

FOREIGN PATENT DOCUMENTS

| JP | 61-233976 | 10/1986 |
|----|-----------|---------|
| JP | 61-233977 | 10/1986 |
| JP | 63-26962 | 2/1988 |
| JP | 2-18869 | 1/1990 |
| JP | 7-235324 | 9/1995 |
| JP | 2000-512068 | 9/2000 |
| JP | 2002-373685 | 12/2002 |
| JP | 2004-79490 | 3/2004 |
| JP | 2004-179100 | * 6/2004 |
| WO | WO-97/48142 | 12/1997 |

OTHER PUBLICATIONS

Japanese Office Action for Application No. 2003-347194, dated Feb. 26, 2008.

* cited by examiner

*Primary Examiner*—Patrick Ryan
*Assistant Examiner*—Thomas H. Pasrsons
(74) *Attorney, Agent, or Firm*—Lahive & Cockfield, LLP; Anthony A. Laurentano

(57) ABSTRACT

A stop method for a fuel cell system that includes a fuel cell unit in which hydrogen is supplied to an anode, and air is supplied to a cathode so as to generate electrical power via an electrochemical reaction. The stop method includes the steps of stopping supply of hydrogen to the anode, and supplying air to the anode so as to discharge water remaining at the anode.

8 Claims, 3 Drawing Sheets

STOP METHOD FOR FUEL CELL SYSTEM

BACKGROUND OF THE INVENTION

1. Field of the Invention

The present invention relates to a stop method for a fuel cell system which is adapted for cold start-up.

Priority is claimed on Japanese Patent Application No. 2003-347194, filed Oct. 6, 2003, the content of which is incorporated herein by reference.

2. Description of the Related Art

In recent years, fuel cell powered vehicles have been proposed, each of which includes a fuel cell system as a driving source of the vehicle. As a type of fuel cell system for such vehicles, a fuel cell system is known which includes a predetermined number of cell units stacked one on the other, each of which includes an anode, a cathode, and an electrolyte membrane sandwiched therebetween. When hydrogen is supplied to the anode and air (oxygen) is supplied to the cathode, electrical power generation is performed via an electrochemical reaction of hydrogen and oxygen which is accompanied by producing of water. Even though water is mainly formed at the cathode during an operation of the fuel cell system, a portion of the water at the cathode may move to the anode through the electrolyte membrane sandwiched between the cathode and the anode. In addition, the reaction gases (hydrogen and oxygen) are humidified in order to prevent the electrolyte membrane from becoming dry.

When the power generation of the fuel cell system is to be stopped, the above-mentioned formed water and humidifying water remain in gas flow paths of the fuel cell units; therefore, when the power generation is stopped while water remains therein, the remaining water may freeze at low temperature, and the frozen water (ice) may block supply and discharge of the reaction gases (hydrogen and air), which leads to degradation of start-up performance at low temperature.

To solve such a problem, Published Japanese Translation No. 2000-512068 of the PCT International Application discloses a cold start-up method in which a fuel cell system is warmed by making the fuel cell system supply electrical energy to an external electrical circuit. Moreover, in order to improve start-up performance at low temperature, this published document discloses a technology in which formed water remaining in gas flow paths of the fuel cell units is discharged using a nitrogen gas or the like when the operation of the fuel cell system is stopped so as to prevent freezing of water in the gas flow paths during stop periods of the fuel cell system.

In the aforementioned prior art technology, start-up performance at low temperature is improved by discharging water remaining in the gas flow paths of the fuel cell units; however, because a nitrogen gas is used for discharging water remaining in the gas flow paths of the fuel cell units, a tank, such as a dedicated nitrogen container, must be provided in the vehicle, which is a problem in view of limited installation capacity of a fuel cell powered vehicle.

Furthermore, another method has been proposed in which reaction gases (hydrogen and oxidizing agent such as air) are supplied to a fuel cell system during stoppage of the fuel cell system; however, increase in hydrogen consumption is a problem because a significant amount of reaction gas (i.e., hydrogen) that does not contribute to power generation must be supplied to an anode to discharge remaining water at the anode.

SUMMARY OF THE INVENTION

In consideration of the above circumstances, an object of the present invention is to provide a stop method for a fuel cell system by which water remaining in gas flow paths in the fuel cell units during stoppage of the fuel cell system, more specifically, water remaining in gas flow paths at the anode, is discharged so that start-up performance of the fuel cell system can be improved while using a relatively small amount of hydrogen to discharge water remaining in gas flow paths at an anode.

In order to achieve the above object, the present invention provides a stop method for a fuel cell system that includes a fuel cell unit in which hydrogen is supplied to an anode, and air is supplied to a cathode so as to generate electrical power via an electrochemical reaction, the stop method including the steps of: stopping supply of hydrogen to the anode; and supplying air to the anode so as to discharge water remaining at the anode.

According to the above method, because air is supplied to the anode while not supplying hydrogen thereto upon stoppage of the anode, water remaining at the anode can be discharged while significantly reducing the amount of consumed hydrogen. As a result, start-up performance of the fuel cell system can be improved due to discharge of water remaining in the gas flow paths upon stoppage of the fuel cell system. Accordingly, fuel economy can be improved.

In the step of supplying air to the anode in the above method, a portion of air to be supplied to the cathode may be branched into the anode.

According to the above method, because water remaining at the anode which is inactive can be discharged using an supply unit that supplies air as a reaction gas to the cathode, the number of components can be reduced, and installation of the fuel cell system in a vehicle becomes easier, i.e., efficiency of the installation processes can be improved. In addition, because a remaining water discharging process at the cathode and a remaining water discharging process at the anode can be simultaneously performed, efficiency of the processes for stopping the fuel cell system can be improved.

In the above method, pressure at an inlet region of the anode and pressure at an outlet region of the anode may be measured, and it may be determined that discharge of the remaining water is completed when the difference between the pressures at the inlet region and at the outlet region becomes less than a predetermined threshold.

When water remains at the anode, the difference between the pressures at the inlet region and at the outlet region is greater than the predetermined threshold since the remaining water causes pressure loss, while on the other hand, cause of pressure loss is dissipated by discharging water. Therefore, according to the above method, it is determined that discharge of the remaining water is completed when the difference between the pressures at the inlet region and at the outlet region becomes less than a predetermined threshold, and thus completion of discharge of the remaining water can be accurately detected.

The above method may further include, after the step of stopping supply of hydrogen, the steps of: burning hydrogen remaining at the inlet region of the anode so as to obtain an inactive gas; and supplying the inactive gas to the anode.

According to the above method, because hydrogen remaining at the inlet region of the anode is burnt so as to obtain an inactive gas, and then the inactive gas is supplied to the anode, reaction of hydrogen with oxygen contained in air at the anode can be prevented, and discharge of the remaining water using air can be immediately started; therefore, time for stopping the fuel cell system can be shortened.

In the above method, the fuel cell system may include a dilution unit in which an off-gas, containing unreacted hydrogen, discharged from the anode is mixed with air discharged from the cathode.

According to the above method, because the off-gas, containing unreacted hydrogen, discharged from the anode can be diluted in the dilution unit by mixing with air discharged from the cathode, concentration of hydrogen discharged from the anode can be maintained at a low level, time for stopping the fuel cell system can be further shortened, i.e., efficiency in stopping the fuel cell system can be improved.

The present invention further provides a stop method for a fuel cell system that includes a fuel cell unit in which hydrogen is supplied to an anode, and air is supplied to a cathode so as to generate electrical power via an electrochemical reaction, and a hydrogen circulation path through which unreacted hydrogen is recycled, the stop method including the steps of: stopping supply of hydrogen to the hydrogen circulation path; and supplying air to the hydrogen circulation path so as to discharge water remaining at the anode when it is determined that gas pressure in the hydrogen circulation path becomes lower than a predetermined pressure.

When supply of a hydrogen gas to the hydrogen circulation path is stopped, and the pressure of gas in the hydrogen circulation path is less than a predetermined pressure, it is determined that the hydrogen gas contained in the hydrogen circulation path has been sufficiently discharged. Accordingly, by the consequent supply of air into the hydrogen circulation path, water remaining at the anode can be sufficiently discharged, and thus the amount of consumed hydrogen can be reduced.

DESCRIPTION OF THE PREFERRED EMBODIMENTS

Embodiments of a stop method for a fuel cell system according to the invention will be explained below with reference to the appended drawings. The embodiment to be explained below is an example of a stop method for a fuel cell system that is to be installed in a fuel cell powered vehicle.

Figure 1:
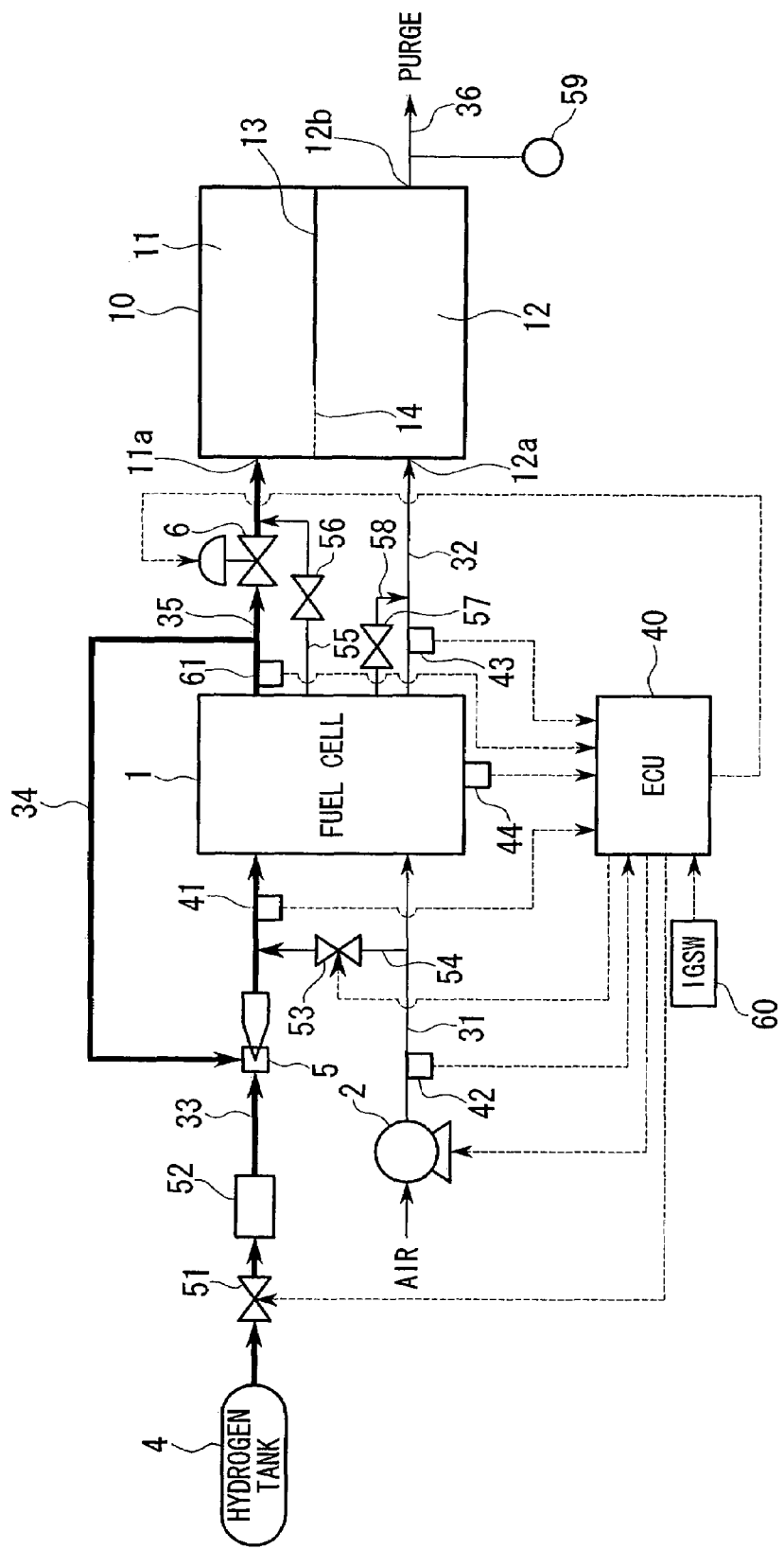
FIG. 1 is a schematic block diagram showing a fuel cell system to which a stop method for a fuel cell system according to a first embodiment of the present invention is applied.

FIG. 1 is a schematic block diagram showing a fuel cell system to which a stop method for a fuel cell system according to a first embodiment of the present invention is applied.

A fuel cell 1 is a stack that is formed by stacking a plurality of fuel cell units, each of which includes a solid polymer electrolyte membrane consisting of, for example, a solid polymer ion exchange membrane, and an anode and a cathode that sandwich the solid polymer electrolyte membrane therebetween. When hydrogen as a fuel gas is supplied to the anode, and air containing oxygen as an oxidizing gas is supplied to the cathode, hydrogen ions are produced in the anode area by catalytic reaction, which pass through the solid polymer electrolyte membrane, and which reach the cathode area where the hydrogen ions electrochemically react with oxygen so that electrical power is generated, and water is formed. Because a portion of the water formed in the cathode area permeates the solid polymer electrolyte membrane so as to diffuse into the anode area, there is also water in the anode area.

Air is pressurized by a compressor 2 to a predetermined pressure, and the pressurized air is supplied to the cathode of each of the fuel cell units of the fuel cell 1 through an air supply path 31. The air supply path 31 is provided with a humidifier (not shown) so that humidified air is supplied to the fuel cell 1 in order to prevent the solid polymer ion exchange membrane or the like from becoming dry. The air supplied to the fuel cell 1 is used for power generation, and is discharged from the fuel cell 1 to an air discharge path 32 along with condensed water contained in the cathode area, and then the discharged air is introduced into a purged hydrogen dilution unit 10. In addition to the air discharge path 32, a drain path 58 having a drain valve 57 is also connected to the cathode. In the following description, the air supplied to the fuel cell 1 is referred to as "supplied air", and the air discharged from the fuel cell 1 is referred to as "discharged air", respectively, in order to distinguish them from each other.

On the other hand, a hydrogen gas supplied from a hydrogen tank 4 is supplied to the anode of the fuel cell 1 via a shutoff valve 51, a pressure regulator 52, and a hydrogen gas supply path 33. The hydrogen gas is also humidified by a humidifier (not shown) in a manner similar to the case of air, and thus humidified hydrogen is supplied to the fuel cell 1. Unreacted hydrogen gas, i.e., unused hydrogen gas is discharged from the anode area to a hydrogen gas circulation path 34 along with condensed water contained in the anode area, and then the discharged hydrogen is introduced into the hydrogen gas supply path 33 via an ejector 5. In other words, the hydrogen gas discharged from the fuel cell 1 is mixed with a fresh hydrogen gas supplied from the hydrogen tank 4, and the mixture is supplied to the anode area of the fuel cell 1 again. A hydrogen pump may be used instead of the ejector 5.

A hydrogen gas discharge path 35, which includes a purge valve 6, branches off the hydrogen gas circulation path 34. The hydrogen gas discharge path 35 is connected to the purged hydrogen dilution unit 10.

The purged hydrogen dilution unit 10 is a container whose interior is divided by a partition 13 into a holding chamber 11 (holding region) and a dilution chamber 12 (dilution region). The dilution chamber 12 and the holding chamber 11 are allowed to communicate with each other via a communication portion 14. The communication portion 14 includes, for example, a metal plate having a number of small holes therein (generally referred to as a "punched metal") or porous ceramics.

The aforementioned hydrogen gas discharge path 35 is connected to an inlet 11a of the holding chamber 11. When the purge valve 6 is opened, the hydrogen gas discharged from the fuel cell 1 flows into the holding chamber 11 via the hydrogen gas circulation path 34 and the hydrogen gas discharge path 35, and remains in the holding chamber 11.

The aforementioned air discharge path 32 is connected to an inlet 12a of the dilution chamber 12. The discharged air discharged from the fuel cell 1 flows into the dilution chamber 12 via the air discharge path 32. The fluid in the dilution chamber 12 is discharged from an outlet 12b, which is provided in the opposed side with respect to the inlet 12a, via a discharge pipe 36. Therefore, the discharged air flows in the dilution chamber 12 whenever the discharged air is being discharged from the fuel cell 1.

The air supply path 31 is provided with a flow sensor 42 for measuring flow rate of the supplied air that flows through the air supply path 31. The air discharge path 32 is provided with a temperature sensor 43 for measuring the temperature of the discharged air that flows through the discharge path 32. The hydrogen gas supply path 33 is provided with a pressure sensor 41, at a position downstream of the ejector 5, for measuring the pressure of hydrogen gas flowing through the hydrogen gas supply path 33 (i.e., the pressure of supplied hydrogen). The hydrogen gas discharge path 35 is provided with a pressure sensor 61 for measuring the pressure of an off-gas, containing an unreacted hydrogen gas, flowing through the hydrogen gas discharge path 35 (i.e., the pressure of the discharged off-gas). Furthermore, the fuel cell 1 is provided with a cell voltage sensor 44 for measuring cell voltage of each of the fuel cell units that constitute the fuel cell 1, and the discharge pipe 36 is provided with a hydrogen concentration sensor 59 for measuring concentration of hydrogen gas flowing through the discharge pipe 36. The output signals of the aforementioned sensors 41 to 44, 61, and 59, and ON and OFF signal of an ignition switch 60 are input into an ECU 40. In addition, as in the case of the cathode, a drain path 55 having a drain valve 56 is connected to the anode in addition to the hydrogen discharge path 35.

A switching path 54 having a switching valve 53 branches off the air supply path 31, and merges with the hydrogen gas supply path 33 at a downstream portion thereof with respect to the ejector 5. Accordingly, when the switching valve 53 is opened, air can be supplied to the hydrogen gas supply path 33.

According to the present embodiment, in the fuel cell system configured as described above, a purging operation is executed for a predetermined time by opening the purge valve 6 when power generation of the fuel cell 1 progresses slowly in order to remove water and nitrogen in the anode area.

During the purging operation in which the purge valve 6 is opened, hydrogen gas purged from the fuel cell 1 flows into the holding chamber 11, and diffuses in the entirety of the holding chamber 11. When the purge valve 6 is closed, flow of hydrogen gas into the holding chamber 11 is stopped. On the other hand, because the discharged air flows through the dilution chamber 12 regardless of opening and shutting of the purge valve 6, hydrogen gas remaining in the holding chamber 11 is gradually drawn into the dilution chamber 12 through the communication portion 14, and is mixed with the discharged air in dilution chamber 12 so as to be diluted. As a result, it is possible to lower the hydrogen concentration of the gas discharged from the outlet 12b of the dilution chamber 12 to a level lower than a predetermined concentration, and gas at a low hydrogen concentration can be discharged from the discharge pipe 36.

Figure 2:
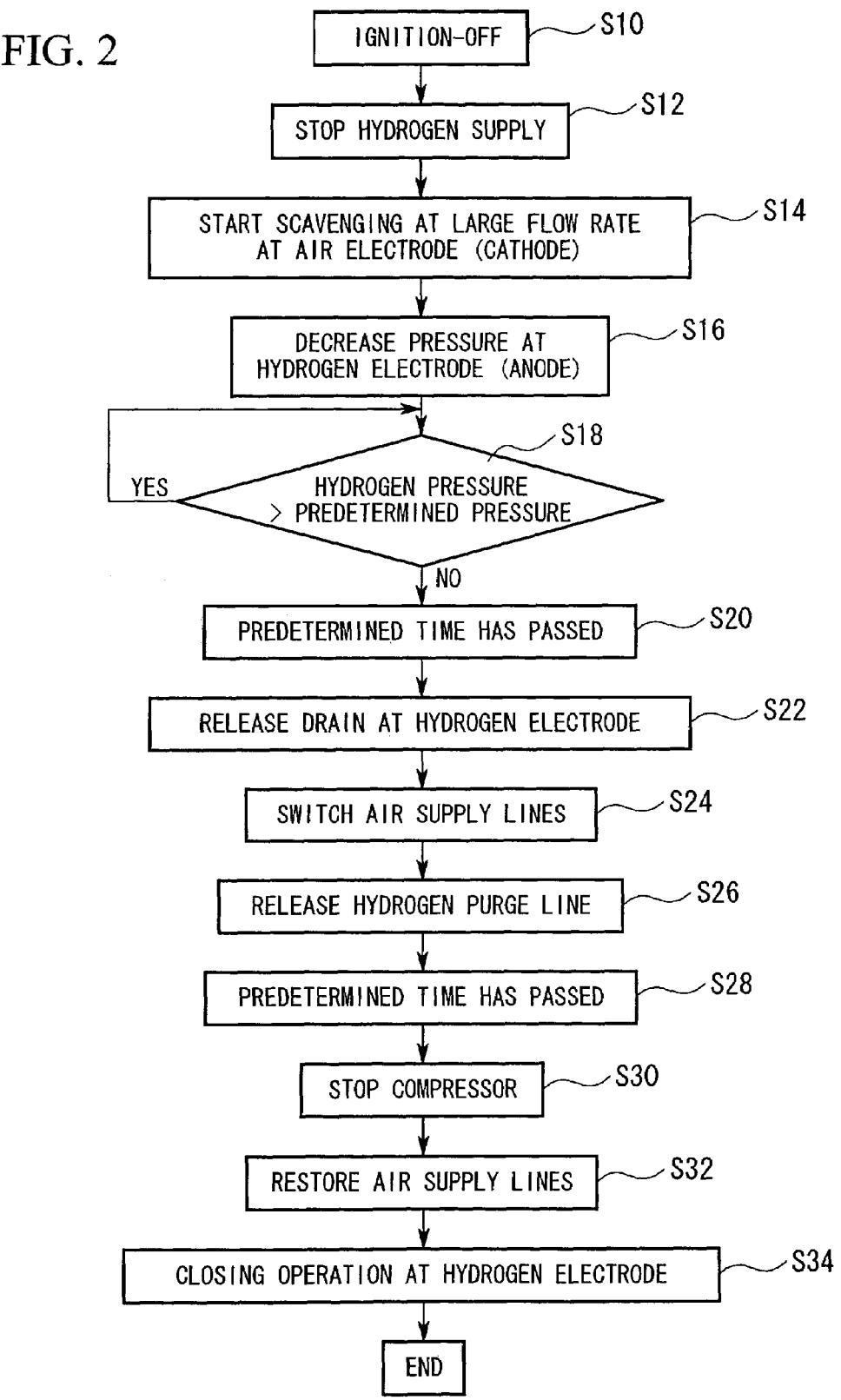
FIG. 2 is a flow chart showing processes for stopping the fuel cell system in the first embodiment.

The flow chart shown in FIG. 2 represents a control routine for stopping the fuel cell system according to the present embodiment. The control routine for hydrogen purging is periodically executed by the ECU 40.

First, in step S10, a stop signal of the ignition switch 60 (IGNITION-OFF signal) is input to the ECU 40, and in step S12, the shutoff valve 51 is closed so as to stop supply of a hydrogen gas to the anode.

Next, in step S14, an operation for discharging water remaining at the cathode is started. During the operation for discharging water, hydrogen concentration in the purged hydrogen dilution unit 10 can be maintained to be lower than a predetermined level by supplying a sufficient amount of air into the purged hydrogen dilution unit 10.

Next, in step S16, an operation for decreasing pressure at the anode is performed.

In step S18, it is determined whether the hydrogen pressure at the inlet of the anode measured by the pressure sensor 41 is greater than a predetermined pressure. When the result of the determination is "YES", the operation returns to step S16, and when the result of the determination is "NO", the operation proceeds to step S20.

When supply of a hydrogen gas to the hydrogen gas circulation path 34 is stopped, and the pressure of gas in the hydrogen gas circulation path 34 is less than a predetermined pressure, it is determined that the hydrogen gas contained in the hydrogen gas circulation path 34 has been sufficiently discharged. Accordingly, by the consequent supply of air into the hydrogen gas circulation path 34, water remaining at the anode can be sufficiently discharged, and thus the amount of consumed hydrogen can be reduced.

In this process, as shown in step S22, the hydrogen gas contained in the hydrogen gas circulation path 34 is discharged by periodically opening the purge valve 6. The hydrogen gas discharged from the hydrogen gas circulation path 34 is introduced into the holding chamber 11 of the purged hydrogen dilution unit 10. The hydrogen gas in the holding chamber 11 is diluted in the dilution chamber 12 by mixing with the discharged air, and is discharged from the outlet 12b. It is preferable that the hydrogen concentration of the discharged air be monitored by a hydrogen concentration sensor (not shown) or the like provided at the outlet 12b, and the purge valve be controlled so that the hydrogen concentration is maintained to be less than a predetermined concentration.

In step S24, the switching valve 53 is opened so as to allow air in the air supply path 31 to flow into the hydrogen gas supply path 33 via the switching path 54, and supply of air to the anode is started.

In step S26, as for the cathode, first, the drain valve 56 is opened so as to execute a purging process through the drain path 55. Next, the purge valve 6 is opened so as to execute a purging operation of the hydrogen gas discharge path 35. In step S28, it is determined that a predetermined time has passed, and in step S30, the compressor 2 is stopped. In step S32, the switching valve 53 is closed so as to stop supply of air from the switching path 54 to the hydrogen gas supply path 33, and thus the fuel cell 1 is placed in a state before starting the operation for stopping power generation.

In step S34, the purge valve 6 is closed so as to stop gas flow between the anode and the outside thereof, and thus the operations are completed.

As explained above, when the anode is to be made inactive, supply of a hydrogen gas is stopped, and then air is supplied to the anode so as to discharge water remaining at the anode. In this manner, the amount of hydrogen that is lost during the water discharging operation can be significantly reduced when compared with a conventional method. By discharging water remaining in the fuel cell 1 when the operation of the fuel cell 1 is to be stopped, start-up performance of the fuel cell system and fuel economy can be improved.

Instead of the operation in step S28 explained above, pressure at the inlet of the anode and pressure at the outlet of the anode may be measured by the pressure sensors 41 and 61, and it may be determined that the discharge of remaining water has been completed when the difference between pressure at the inlet and pressure at the outlet becomes less than a predetermined threshold. According to this method, completion of discharge of water remaining at the anode can be accurately detected, and supply of air to the anode can be immediately stopped upon completion of discharge of water.

Figure 3:
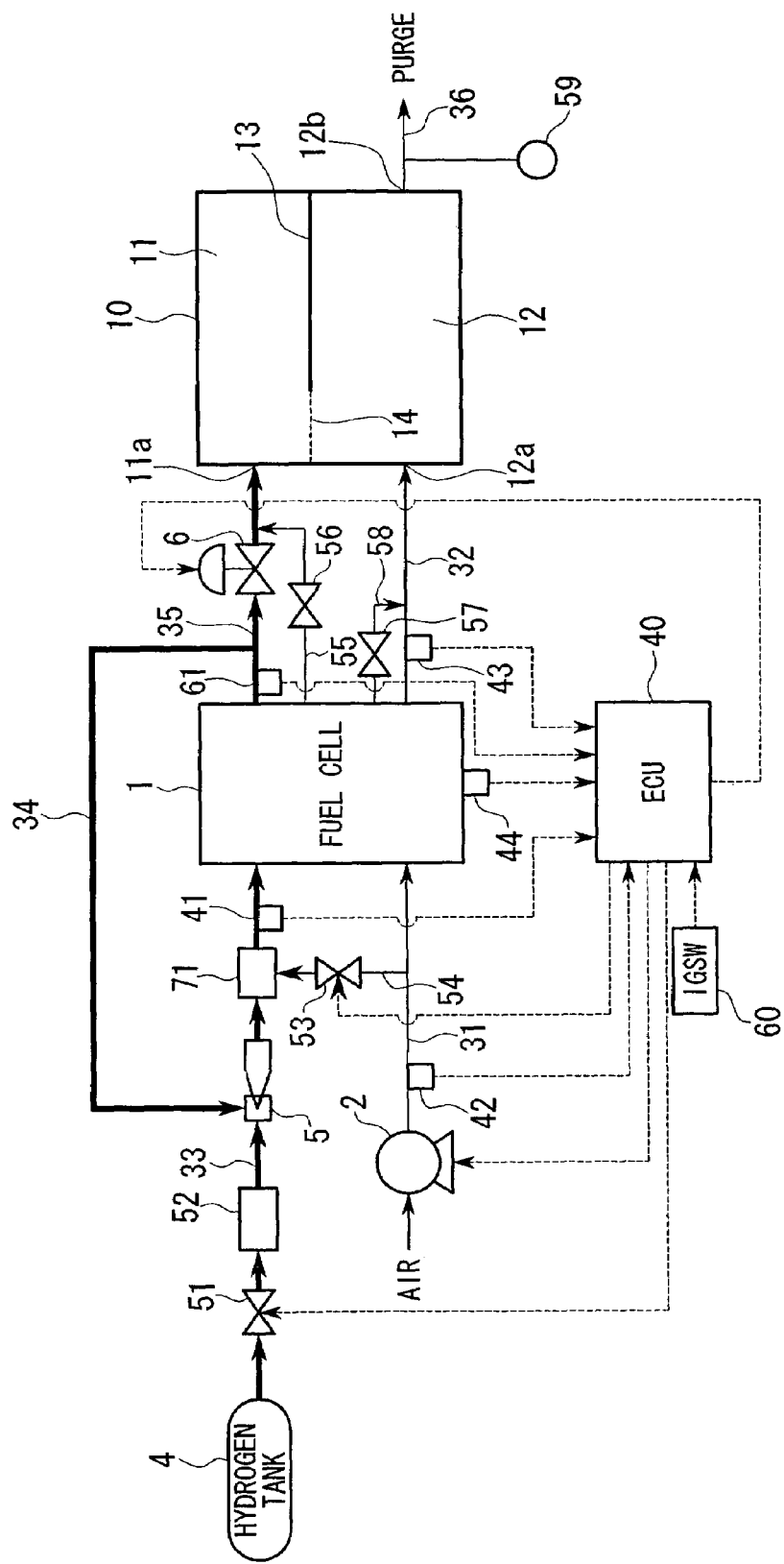
FIG. 3 is a schematic block diagram showing a fuel cell system to which a stop method for a fuel cell system according to a second embodiment of the present invention is applied.

FIG. 3 is a schematic block diagram showing a fuel cell system to which a stop method for a fuel cell system according to a second embodiment of the present invention is applied. The second embodiment differs from the first embodiment in that a combustion chamber 71 is provided at a merging region of the hydrogen gas supply path 33 and the switching path 54. According to this construction, in addition to the advantageous effects obtained by the first embodiment, when the operation of the fuel cell system is to be stopped, the hydrogen gas remaining at the inlet region of the anode can be burnt using oxygen contained in the supplied air so as to obtain an inactive gas mainly containing nitrogen, and the inactive gas can be supplied to the anode. Accordingly, further electrical power generation between the anode can be prevented, and the operation for discharging the remaining water can be immediately started, and thus time for the operation for stopping the fuel cell system can be shortened. Furthermore, in this case, a dedicated container for holding an inert gas, such as a nitrogen container, does not have to be provided; therefore, freedom of installation in a fuel cell powered vehicle is increased.

While preferred embodiments of the invention have been described and illustrated above, it should be understood that these are exemplary of the invention and are not to be considered as limiting.

For example, the humidifier may be omitted in the fuel cell system. When supply of a hydrogen gas to the fuel cell units is stopped, pressure of hydrogen at the anode is decreased. In this case, pressure of air supplied to the cathode may be decreased in accordance with the pressure reduction at the anode. According to this method, the pressure difference between the electrodes (the anode and cathode), which applies force to the solid polymer ion exchange membrane, can be maintained in a preferable range. Moreover, it is preferable that the pressure of air supplied to the cathode be decreased in accordance with the pressure at the anode so that the pressure difference between the electrodes is maintained to be less than a predetermined pressure.

Further additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A stop method for a fuel cell system that comprises a fuel cell unit in which hydrogen is supplied to an anode, and air is supplied to a cathode so as to generate electrical power via an electrochemical reaction, the stop method comprising the sequential steps of:
    stopping supply of hydrogen to the anode;
    measuring hydrogen pressure at an inlet of the anode;
    determining the hydrogen pressure at the inlet of the anode is less than a predetermined pressure; and
    supplying air to the anode so as to discharge water and unreacted hydrogen remaining at the anode;
    wherein the fuel cell system comprises a dilution unit in which an off-gas, containing the unreacted hydrogen and air, discharged from the anode is mixed with air discharged from the cathode.

2. A stop method for a fuel cell system according to claim 1, wherein, in the step of supplying air to the anode, a portion of air to be supplied to the cathode is branched into the anode.

3. A stop method for a fuel cell system according to claim 1, wherein pressure at an inlet region of the anode and pressure at an outlet region of the anode are measured, and it is determined that discharge of the remaining water is completed when the difference between the pressures at the inlet region and at the outlet region becomes less than a predetermined threshold.

4. A stop method for a fuel cell system according to claim 1, further comprising, after the step of stopping supply of hydrogen, the steps of:
    burning hydrogen remaining at the inlet region of the anode so as to obtain an inactive gas; and
    supplying the inactive gas to the anode.

5. A stop method for a fuel cell system that comprises a fuel cell unit in which hydrogen is supplied to an anode, and air is supplied to a cathode so as to generate electrical power via an electrochemical reaction, and a hydrogen circulation path through which unreacted hydrogen is recycled, the stop method comprising the sequential steps of:
    stopping supply of hydrogen to the hydrogen circulation path;
    measuring hydrogen pressure at an inlet of the anode;
    determining that gas pressure in the hydrogen circulation path is less than a predetermined pressure; and
    supplying air to the hydrogen circulation path so as to discharge water and unreacted hydrogen remaining at the anode,
    wherein the fuel cell system comprises a dilution unit in which an off-gas, containing the unreacted hydrogen and air, discharged from the anode is mixed with air discharged from the cathode.

6. A stop method for a fuel cell system according to claim 5, wherein, in the step of supplying air to the anode, a portion of air to be supplied to the cathode is branched into the anode.

7. A stop method for a fuel cell system according to claim 5, wherein pressure at an inlet region of the anode and pressure at an outlet region of the anode are measured, and it is determined that discharge of the remaining water is completed when the difference between the pressures at the inlet region and at the outlet region becomes less than a predetermined threshold.

8. A stop method for a fuel cell system according to claim 5, further comprising, after the step of stopping supply of hydrogen, the steps of:
    burning hydrogen remaining at the inlet region of the anode so as to obtain an inactive gas; and
    supplying the inactive gas to the anode.

* * * * *